(12) United States Patent
Zhang et al.

(10) Patent No.: US 7,086,083 B2
(45) Date of Patent: *Aug. 1, 2006

(54) NOISE MEASUREMENT SYSTEM

(75) Inventors: Qin Zhang, Bensalem, PA (US); Pingnan Shi, Indianapolis, IN (US)

(73) Assignee: Wavetek Wandell Goltermann, Inc., Indianapolis, IN (US)

( * ) Notice: Subject to any disclaimer, the term of this patent is extended or adjusted under 35 U.S.C. 154(b) by 1104 days.

This patent is subject to a terminal disclaimer.

(21) Appl. No.: 09/835,697

(22) Filed: Apr. 16, 2001

(65) Prior Publication Data

US 2002/0036713 A1    Mar. 28, 2002

Related U.S. Application Data

(63) Continuation of application No. 09/021,612, filed on Feb. 10, 1998, now Pat. No. 6,219,095.

(51) Int. Cl.
*H04N 7/16* (2006.01)
*H04N 7/173* (2006.01)
*H04N 17/00* (2006.01)
*H04N 5/21* (2006.01)

(52) U.S. Cl. .............. 725/143; 725/107; 725/124; 348/180; 348/192; 348/193; 348/607

(58) Field of Classification Search ............... 725/107, 725/148, 125, 143, 124; 348/180, 192, 193, 348/607; 382/225
See application file for complete search history.

(56) References Cited

U.S. PATENT DOCUMENTS

| | | | | |
|---|---|---|---|---|
| 5,548,343 A | * | 8/1996 | Paquier et al. | 348/691 |
| 5,617,137 A | * | 4/1997 | Whitlow | 348/193 |
| 5,642,154 A | * | 6/1997 | Krishnamurthy et al. | 725/107 |
| 5,661,529 A | * | 8/1997 | Ward | 348/607 |
| 5,831,679 A | * | 11/1998 | Montgomery et al. | 348/473 |
| 5,889,759 A | * | 3/1999 | McGibney | 370/207 |
| 6,061,393 A | * | 5/2000 | Tsui et al. | 375/224 |
| 6,118,479 A | * | 9/2000 | Maeda et al. | 348/192 |
| 6,219,095 B1 | * | 4/2001 | Zhang et al. | 348/192 |
| 6,310,646 B1 | * | 10/2001 | Shi et al. | 348/194 |
| 6,600,515 B1 | * | 7/2003 | Bowyer et al. | 348/461 |

* cited by examiner

*Primary Examiner*—Christopher Grant
*Assistant Examiner*—Son P. Huynh
(74) *Attorney, Agent, or Firm*—Allen, Dyer, Doppelt, Milbrath & Gilchrist, P.A.

(57) ABSTRACT

A method of determining noise in a CATV channel, wherein the CATV channel comprises a predetermined frequency band, that employs digital signal processing to isolate the noise signal from an in-service television signal. The method includes an initial step of obtaining a television signal corresponding to a predetermined CATV channel, the television channel comprising a carrier signal modulated by an information signal. Thereafter, the method includes the step of sampling at least a part of the television signal to produce a digital signal segment, said digital signal segment comprising a carrier component, a noise signals component, and an information signal component, wherein said information signal component has a substantially predetermined signal pattern. The method then employs digital signal processing to separate the carrier component from the digital signal segment to produce a baseband signal substantially comprising the information signal and the noise signal. Finally, an estimate of the information signal is obtained and then subtracted from the baseband signal, thereby producing a noise signal estimate.

9 Claims, 6 Drawing Sheets

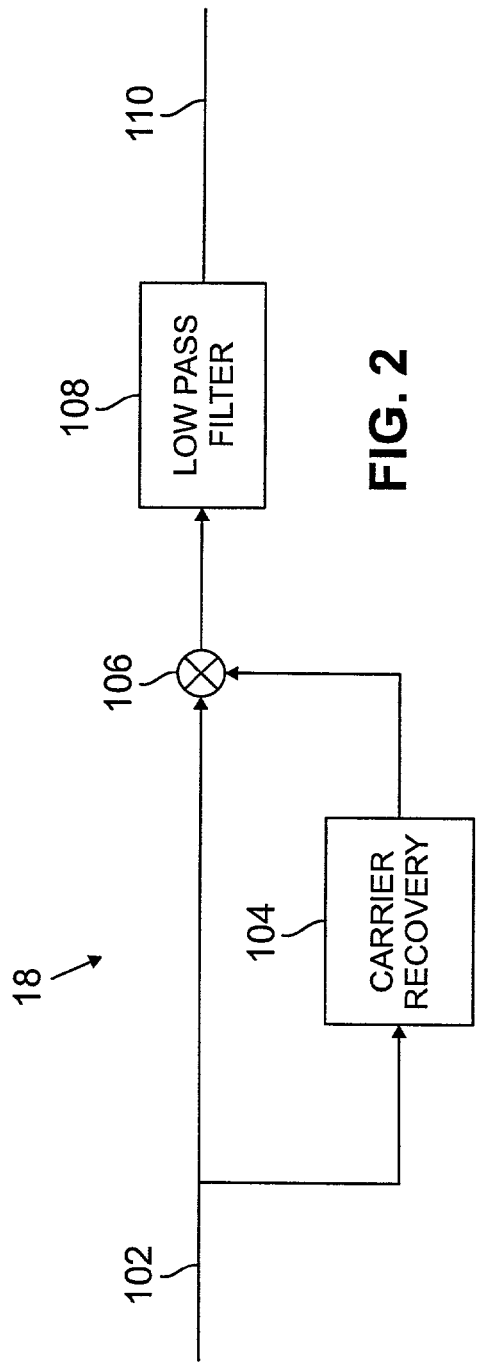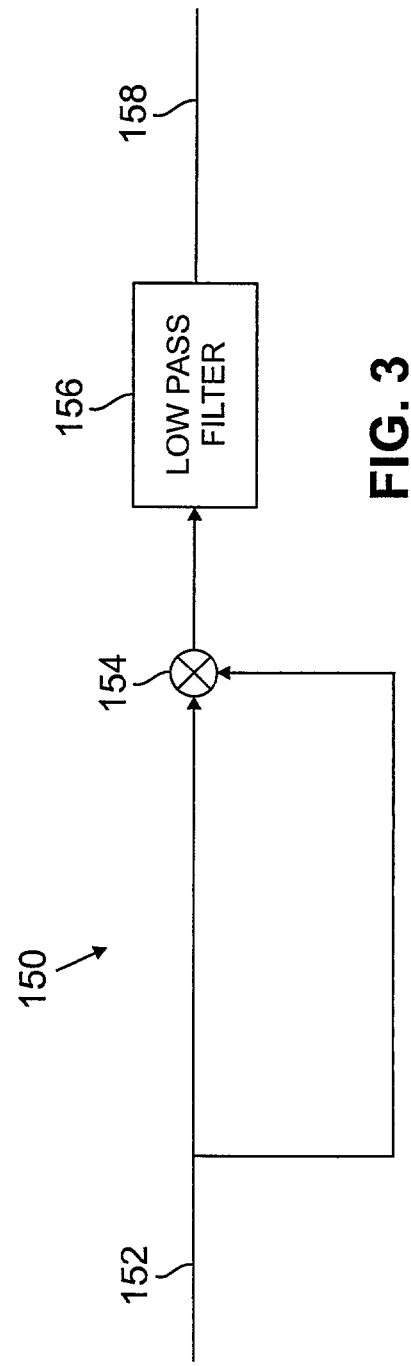

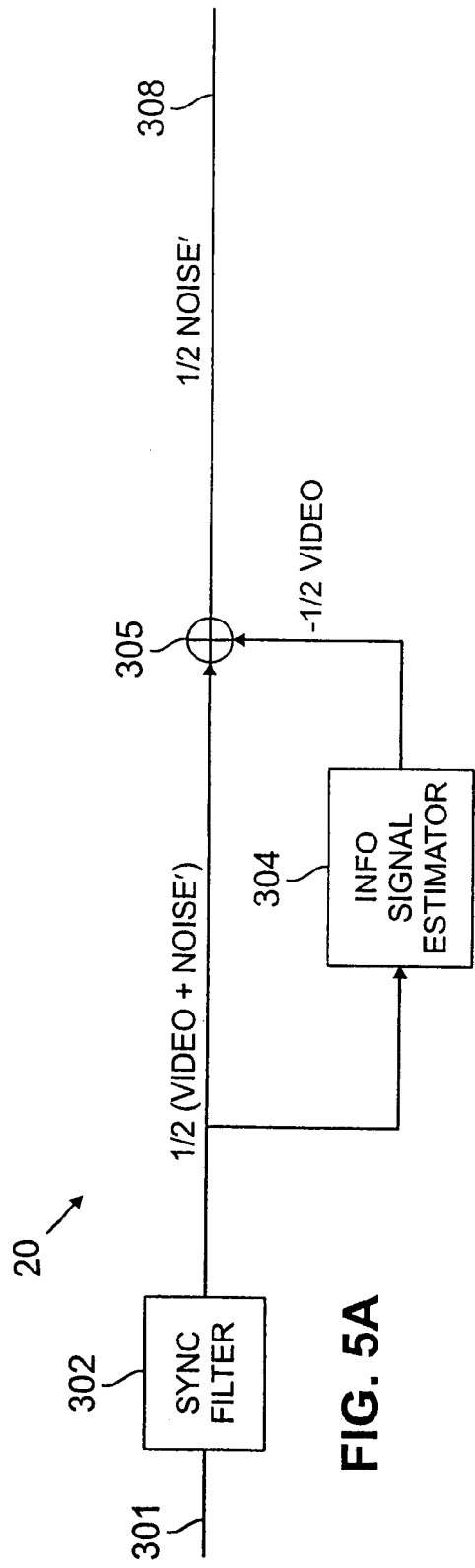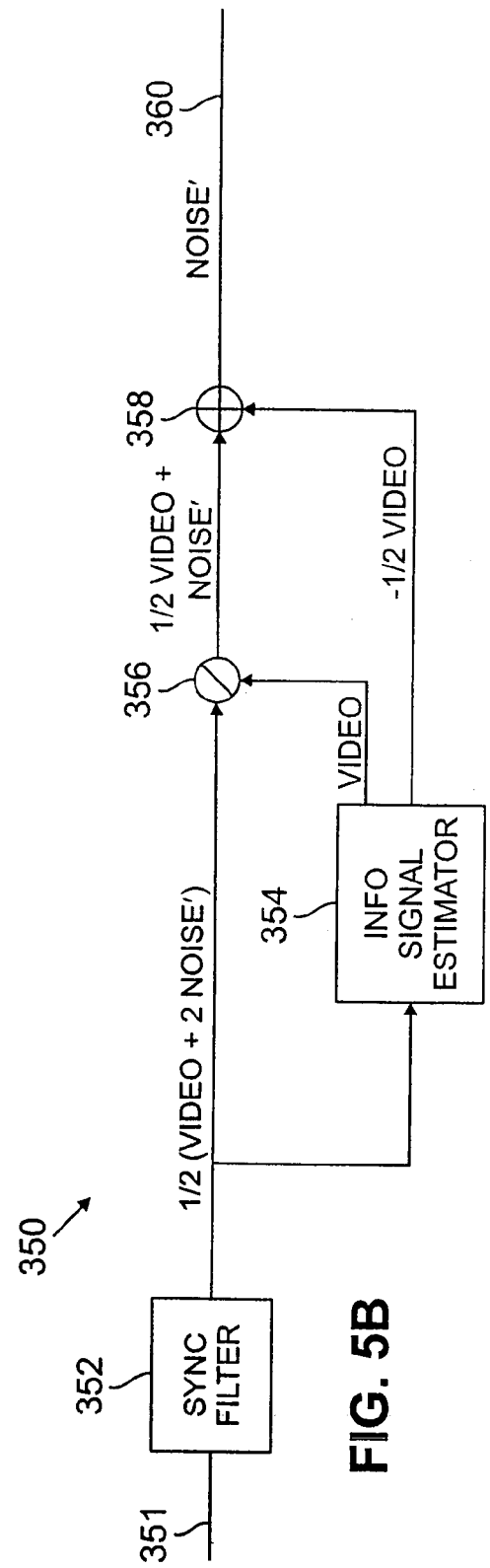

NOISE MEASUREMENT SYSTEM

This is a continuation of U.S. patent application Ser. No. 09/021,612, filed on Feb. 10, 1998 now U.S. Pat. No. 6,219,095.

FIELD OF THE INVENTION

The present invention relates generally to the field of radio frequency signal testing, and more particularly, to cable television signal testing.

BACKGROUND OF THE INVENTION

The radio frequency ("RF") signals used to transmit information over cable television ("CATV") distribution systems are subject to several types of undesirable noise. For example, snow noise, composite second order ("CSO") noise, and composite triple beat ("CTB") noise are three well-known sources of noise typically found in RF signals transmitted over CATV distribution systems. In efforts to improve service, CATV service providers perform noise measurements to quantify the performance level of the network, or a portion thereof.

Such CATV noise measurements typically include measurements of particular types of noise, i.e., CTB or CSO noise, for diagnosis of CATV distribution system problems. If a particular type of noise is determined to be unusually high, while other types of noise are determined to be at normal levels, the CATV service provider can more readily determine the appropriate corrective action to be taken. For example, if the CSO noise level is measured to be unusually high, then the service provider might try a first set of corrective actions. If, however, the CTB noise is measured to be unusually high, then the service provider might try a second set of corrective actions. Thus, knowledge of both the presence and type of noise is important in CATV system diagnostics.

Moreover, federal regulations require that CATV service providers perform a plurality of noise measurements on a regular basis, including, for example, a CTB noise measurement. CTB noise is caused by concentrations of triple beat signals that occur near channel frequencies in cable television systems. As is well known in the art, the triple beat signals are caused by the beating of signals from three other CATV channels. The resulting CTB causes interference, thereby reducing signal quality. In United States CATV systems, CTB noise is generally concentrated within 15 Khz of the visual carrier frequency of select channels in a CATV broadband signal. By contrast, CSO noise is concentrated near 0.75 MHz and 1.25 MHz above the carrier frequency and near 0.75 MHz and 1.25 MHz below the carrier frequency. Snow noise, moreover, is more or less evenly distributed across the entire CATV broadband signal spectrum. Because CTB noise is concentrated so close to the channel frequency, CTB noise is often more difficult to measure than snow noise or CSO noise.

Because the CTB noise energy is located near the carrier frequency, each channel historically had to be taken out of service in order to facilitate the CTB measurement. Specifically, a technician would first attach test measurement equipment to a remote site on the cable distribution network and measure the carrier level of the CATV channel while the channel was in-service (or producing a test pattern). The technician would then cause the CATV transmitter to take a channel out of service, or in other words, remove the carrier from that channel. Once the carrier was removed, the technician would perform a signal strength or power measurement within a band of +/-15 Khz from the carrier frequency. Because the carrier signal had been removed from the channel, the measured signal power found within +/-15 Khz of the carrier frequency constituted the CTB noise level. The ratio of the noise power level to the carrier power level constituted the CTB noise measurement. Once the CTB noise measurement was completed, the CATV channel could be placed in-service again.

The above described method has at least one severe drawback. Specifically, removing the carrier signal causes interruptions in CATV service, which is undesirable for several reasons. Interruptions in CATV service often lead to customer dissatisfaction and customer complaints.

To reduce service interruptions, U.S. Pat. No. 5,617,137 to Whitlow shows an in-service CTB noise measurement system that measures the CTB noise level of an active television signal. The Whitlow method first demodulates the received television signal to produce a baseband television signal including the noise signal. Then, the baseband signal information is removed, leaving only the noise signal. An RMS type measurement is then performed on the noise signal. To obtain a CTB noise measurement, the baseband signal is first filtered such that it contains primarily only frequencies in the CTB noise energy spectrum. Accordingly, the RMS measurement yields, in theory, on the CTB noise.

One drawback of the Whitlow method described above is the method in which the baseband signal information is removed to produce the noise signal alone. According to the Whitlow method, a portion of one frame of baseband signal information is subtracted from the same portion of a subsequent frame of baseband signal information. The portion of the baseband signal information that is used is a repeating pattern known as the vertical synchronization interval. The drawback of the Whitlow method relates to the subtraction of one frame from a subsequent frame to eliminate the baseband signal information. Specifically, such subtraction also subtracts the CTB noise of one frame from the CTB noise of the subsequent frame. While the CTB noise will often vary greatly from frame to frame, the subtraction of one frame of CTB noise from another frame of CTB noise will not produce a reliable CTB noise estimate.

In addition, the Whitlow method requires analog demodulation devices and filtering devices which undesirably add to the cost of a device designed to carry out the method. In particular, the Whitlow method requires a video demodulator, a low pass filter for isolating the CTB noise, and a band pass filter for generating non-CTB noise floor reference values. Such devices not only add to the cost of the device, but they also occupy valuable circuit board space, and increase the overall size, weight and energy consumption of the device. The space and energy requirements are especially important due to the intended portable nature of the device.

Finally, another drawback to the Whitlow method is that CTB noise measurements are subject to errors contributed by hum noise. Hum noise is 60 Hz noise produced by amplifiers in the CATV distribution system. Hum noise results from imperfect isolation of the 60 Hz power line signal in the power supplies of the amplifiers. It is noted that Whitlow provides some attenuation of hum noise through its subtraction of one video frame from another video frame. Because video frames occur at a frequency of 59.97 times per second, much of the 60 Hz noise is filtered by the subtraction of information in subsequent frames. However, because hum noise can be substantial compared to CTB noise, even a small difference between the frame rate and the hum noise frequency can result in insufficient filtering to remove hum noise from the CTB noise measurement.

As a result, there exists a need for more energy, cost and space efficient in-service noise testing method for use in CATV distribution systems. Moreover, there exists a need for such an in-service noise testing method that has increased accuracy.

SUMMARY OF THE INVENTION

The present invention fulfills the above-stated needs as well as other needs by providing a method and apparatus for performing in-service noise measurements in a CATV channel using digital processing methods for demodulation and spectral analysis. The use of digital processing methods for demodulation and spectral analysis replaces analog filter and demodulation circuitry, thereby reducing the size, cost and energy consumption of the measurement device. In addition, such digital processing methods include generating normalized baseband signal information for subtracting from a baseband signal to produce a noise signal estimate. The subtraction of normalized baseband signal information from a measured signal provides a more accurate signal than prior methods that subtracted one measured noisy signal from another measured noisy signal.

An exemplary method according to the present invention comprises a method of determining noise in a CATV channel, wherein the CATV channel comprises a predetermined frequency band, and wherein the CATV channel is considered to be in-service when a transmitted carrier signal having a frequency in the predetermined frequency band is present. The method includes an initial step of obtaining a television signal corresponding to a predetermined CATV channel, the television channel comprising a carrier signal modulated by an information signal. Thereafter, the method includes the step of sampling at least a part of the television signal to produce a digital signal segment, said digital signal segment comprising a carrier component, a noise signal component, and an information signal component, wherein said information signal component has a substantially predetermined signal pattern. The method then employs digital signal processing to separate the carrier component from the digital signal segment to produce a baseband signal comprising substantially the information signal component and the noise signal component. Finally, an estimate of the information signal is obtained and then subtracted from baseband signal, thereby producing a noise signal estimate.

An exemplary apparatus according to the present invention comprises an apparatus for determining noise in a CATV channel, wherein the CATV channel comprises a predetermined frequency band and the CATV channel is considered to be in-service when a transmitted carrier signal having a frequency in the predetermined frequency band is present. The apparatus includes an A/D converter and a digital signal processing circuit. The A/D converter has an input for attachment to a source of television signals corresponding to a select CATV channel, such television signals each comprising a carrier signal modulated by an information signal. The A/D converter is operable to sample at least a part of a television signal to produce a digital signal segment, said digital signal segment comprising a carrier component, a noise signal component, and an information signal component, and wherein the information signal has a substantially predetermined signal pattern. The digital signal processing ("DSP") circuit is operably connected to receive the digital signal segment from the A/D converter. The DSP circuit is operable to first separate the carrier component from the digital signal segment to produce a baseband component, comprising substantially the information signal component and the noise signal component. The DSP circuit is then further operable to subtract an estimate of the information signal from the baseband signal, thereby producing a noise signal estimate.

The present invention thus provides an in-service noise measurement method and apparatus that has sufficient sensitivity to measure CTB noise, which is located close to each carrier frequency. The present invention may also employ digital signal processing techniques to remove hum noise from a CTB noise measurement.

The above features and advantages, as well as others, will become readily apparent to those of ordinary skill in the art by reference to the following detailed description and accompanying drawings.

BRIEF DESCRIPTION OF THE DRAWINGS

FIG. 2 shows a carrier recovery demodulator for use in the noise measurement circuit of FIG. 1;

FIG. 3 shows a square law demodulator for use in the noise measurement circuit of FIG. 1;

FIG. 5A shows an information signal extractor for use in connection with the noise measurement circuit of FIG. 1 that employs a carrier recovery demodulator;

FIG. 5B shows an information signal extractor for use in connection with the noise measurement circuit of FIG. 1 that employs a square law demodulator;

DETAILED DESCRIPTION

Figure 1:
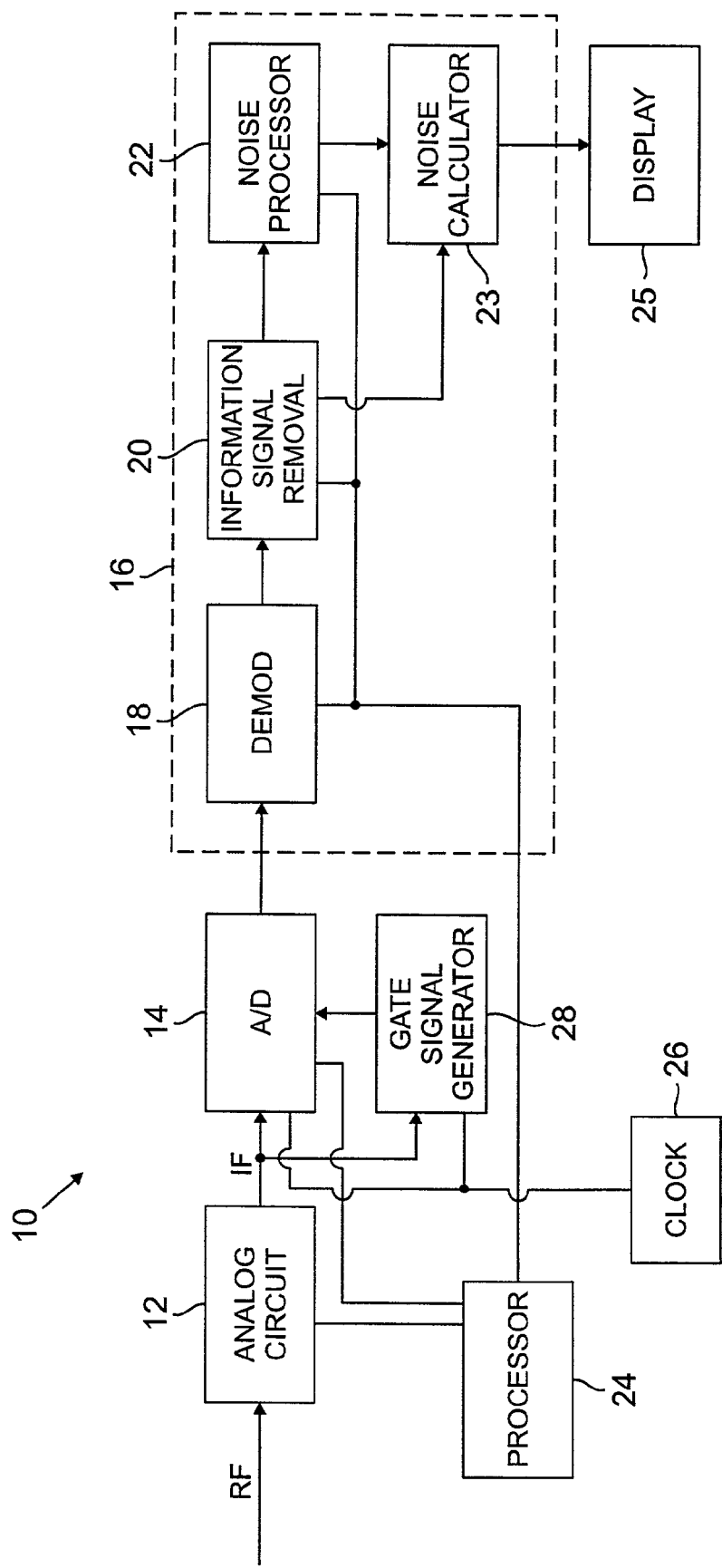
FIG. 1 shows a block diagram of a noise measurement circuit according to the present invention.

FIG. 1 shows a block diagram of an exemplary noise measurement circuit 10 that is operable to receive CATV broadband signals and generate a digital noise signal estimate representative of the noise level of one of the CATV channels within the CATV broadband signal. The noise measurement circuit 10 is further operable to perform digital processing techniques on the noise signal estimate to obtain a measurement of one of a plurality of noise types.

The noise measurement circuit 10 includes an analog radio frequency ("RF") circuit 12, an analog to digital ("A/D") converter 14, a digital signal processing circuit 16, a controller 24, a display 25, and a clock 26. The digital signal processing circuit 16 includes a demodulator 18, an information signal extractor 20, a noise processing circuit 22 and a noise calculator 23

Figure 6:
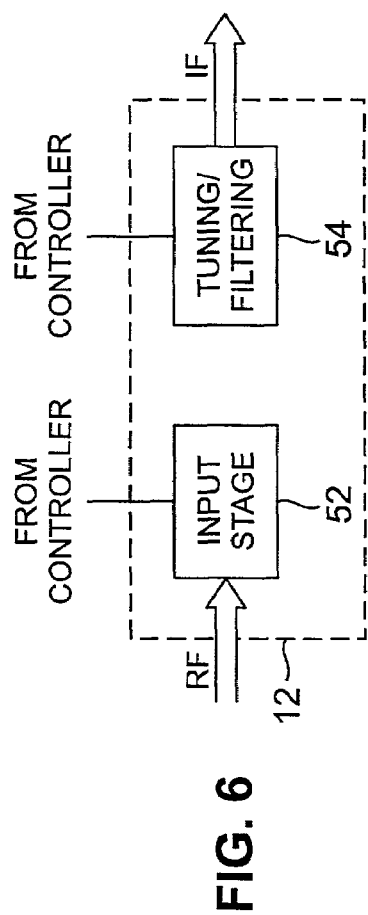
FIG. 6 shows an exemplary embodiment of an analog circuit for use in the noise measurement circuit of FIG. 1.

The analog circuit 12 comprises an analog receiver and tuner that receives a broadband CATV signal, tunes to a select channel and produces a down-converted television signal corresponding to the select channel. FIG. 6 shows an exemplary analog circuit that includes an input stage 52 and a tuning/filtering circuit 54. The input stage 52 includes front end circuitry such as preamplifiers and filters. The tuning/filtering circuit 54 includes frequency conversion stages and additional filters and is operable to provide a down-converted television signal centered at an intermediate frequency ("IF") and having a predefined bandwidth. To tune to a particular channel, the tuning/filtering circuit 54 of the analog circuit 12 selects a down conversion frequency such that the carrier frequency of the channel is converted to the IF.

The IF in the embodiment described herein is 2 MHz. The predefined bandwidth of the down-converted television signal is preferably ±1.5 MHz from the IF in order to include frequencies in which most common types of identifiable noise are located. If only CTB noise is to be measured, then the predefined bandwidth may suitably be reduced to ±150 kHz. from the IF.

Thus, the overall function of the analog circuit 12 is to receive a CATV broadband signal, typically between 5 and 1000 MHz, and then selectively down convert and filter the broadband signal to produce a down-converted television signal, wherein said down-converted television signal consists substantially of a down-converted version of a select CATV channel to be tested or measured. The controller 24 is operably connected to the analog circuit 12 to control the channel tuning function discussed above.

The resulting down-converted television signal comprises a baseband signal modulated onto a down-converted carrier frequency. In an exemplary embodiment, the down-converted carrier frequency of IF carrier has a frequency of 2 MHz.

The analog circuit 12 of FIG. 6 is represented at the functional block level for the purposes of clarity of exposition. Specific analog circuits capable of performing such tuning and filtering are well known to those of ordinary skill in the art.

Referring again to FIG. 1, the analog circuit 12 is connected to provide the down-converted television signal to the A/D converter 14. The A/D converter 14 may suitably be a commercially available 12 bit A/D converter. The A/D converter 14 is further connected to the controller 24 and the clock 26. The clock 26 provides the sampling frequency, which is preferably approximately five times the IF carrier frequency. Accordingly, in an exemplary embodiment, the A/D converter 14 has a sampling rate of 10 MHz.

In a preferred embodiment, a gate signal generator 28 controls or gates the A/D converter 14 such that the A/D converter 14 only digitizes a select portion of the down-converted television signal. The select portion of the television signal is preferably a portion in which the baseband signal or information signal has predictable and repeatable content. In the exemplary embodiment described herein, the select portion of the television signal is the portion of a television signal frame in which one of the vertical synchronization intervals is present.

In particular, the vertical synchronization interval is a portion of an NTSC standard television signal that has a predictable signal pattern which is repeated twice per frame in the television signal, or sixty times per second. All of the vertical synchronization intervals of a television signal have substantially the same signal pattern, and occur at the same point of each video frame within the signal. In other words, the vertical synchronization signal occurs at regularly occurring intervals. In the present embodiment, the select portion of the television signal corresponds to either, but not both, of the vertical synchronization intervals in each television signal frame. The use of only one of the vertical synchronization intervals allows twice as much time for processing the select portion of the signal as would be available if both vertical synchronization intervals were used. Those of ordinary skill in the art may readily employ faster processing devices or other modifications that would make the use of both vertical synchronization intervals advantageous.

In any event, in the exemplary embodiment described herein, the gate signal generator 28 provides a signal the enables the A/D converter 14 only when the A/D converter 14 receives the portion of the down-converted television signal that corresponds to a vertical synchronization interval. Otherwise, the A/D converter 14 is disabled.

The A/D converter 14 digitizes the select portion of the down-converted television as described above to produce a plurality of digital signal segments. Each digital signal segment has a length or duration defined by the length or duration of the select portion of the television signal (per frame). Accordingly, in the exemplary embodiment described herein, each digital signal segment has a length or duration that corresponds to a vertical synchronization interval of one standard NTSC television signal frame. For reasons that will be discussed further below, the digital signal segment should be selected such that it has a duration that is equivalent to the duration of a plurality of horizontal lines of a standard NTSC television signal.

The gating signal generator 28 provides the above described functions in the following manner. As an initial matter, the gating signal generator 28 is connected to receive the down-converted television signal from the analog circuit 12, and is connected to provide an enabling signal or gating signal to an enable pin of the A/D converter 14. The gating signal generator 28 is further connected to the clock 26. In operation, the gating signal generator 28 first receives the down-converted television signal and demodulates the signal using a simple, inexpensive, and relatively imprecise analog demodulation technique, such as envelope detection. The gating signal generator 28 then filters the roughly demodulated television signal using a low pass filter having a cutoff frequency sufficient to remove all content except the vertical synchronization interval. For example, the gating signal generator 28 may use a low pass filter having a cut off frequency of 10 kHz. The gating signal generator 28 then uses any suitable comparator or thresholding circuit to detect the vertical synchronization interval. The gating signal generator 28 then determines, using the pulses from the clock 26, both the duration of the vertical synchronization interval, and the start time of each vertical synchronization interval (in terms of the clock pulses). The gating signal generator 28 uses such information to generate a gating signal that is provided to the A/D converter 14.

The A/D converter 14 samples the down-converted television signal based on the gating signal to generate one digital signal segment per television frame. Each digital signal segment comprises a carrier component CARRIER modulated by an information signal component VIDEO, and further comprises a noise signal component NOISE. The signal CARRIER corresponds to the IF carrier in the television signal, the signal VIDEO corresponds to the information signal, for example, the vertical synchronization interval, of the television signal, and the signal NOISE corresponds to the noise present on the television signal.

The demodulator 18 receives the digital signal segment from the A/D converter 14 and performs digital demodulation thereon to separate the carrier component from the information signal component and the noise signal component. The digital demodulation techniques may suitably be a carrier recovery demodulation technique or a square law demodulation technique, both of which are discussed further below in connection with FIGS. 2 and 3, respectively. The combination of the information signal component and the noise signal component that is left after demodulation is referred to herein as the baseband signal.

The demodulator 18 is operably connected to provide the baseband component to the information signal extractor 20. The information signal extractor 20 performs digital processing techniques to remove the information signal from the baseband signal. To this end, the information signal extractor 20 generates or obtains an estimate of the information signal and essentially subtracts the information signal estimate from the baseband signal to produce the noise signal estimate. FIGS. 5A and 5B describe in further detail two exemplary embodiments of the information signal extractor 20.

The information signal extractor 20 provides the noise signal estimate to the noise processor 22. The information signal extractor 20 also provides the information signal estimate to the noise calculator 23. As will be discussed further below, the noise calculator 23 uses the information signal estimate to generate a carrier level measurement, which is then used for carrier to noise measurements.

The noise processor 22 and noise calculator 23 in combination operate to receive the noise signal estimate and perform digital signal processing on the noise signal estimate to provide any one of a plurality of select noise measurement operations. Specifically, a CATV noise signal may include components such as hum noise, CTB noise, CSO noise, and snow noise. Accordingly, the noise signal estimate generated by the information signal extractor 20 includes a plurality of noise components. The combination of the noise processor 22 and the noise calculator 23 use digital signal processing techniques to substantially isolate one or more noise components for measurement of such components apart from other types of noise that may be present in the noise signal estimate.

For example, to obtain a CTB noise measurement from a noise signal estimate known to have CTB noise and hum noise, the noise processor 22 may substantially reduce the portion of the noise signal energy due to hum noise. To this end, the noise processor 22 may employ digital filtering techniques to filter the noise signal estimate to substantially attenuate the frequencies at which hum noise is located. Such filtering may also be used to isolate CSO noise or snow noise. Once the select type of noise signal is isolated through filtering, the noise calculator 23 measures the remaining noise signal energy using any suitable energy measurement technique.

In a preferred embodiment, however, the noise processor 22 facilitates the measurement of a specific type of noise by first generating a frequency response of the noise signal estimate. The noise calculator 23 then performs a noise energy calculation using only the portions of the generated frequency response that correspond to the types of noise being measured. For example, if CTB noise is being measured, the noise processor 22 first generates the frequency response of the noise signal estimate and the noise calculator 23 performs the noise energy calculation using only the portions of the frequency response between DC and 100 kHz.

To generate a frequency response, the noise processor 22 performs a discrete Fourier transform ("DFT") of the noise signal estimate. The DFT generates a frequency response comprising a plurality of frequency bins, and is defined by a resolution and a frequency range.

Figure 7:
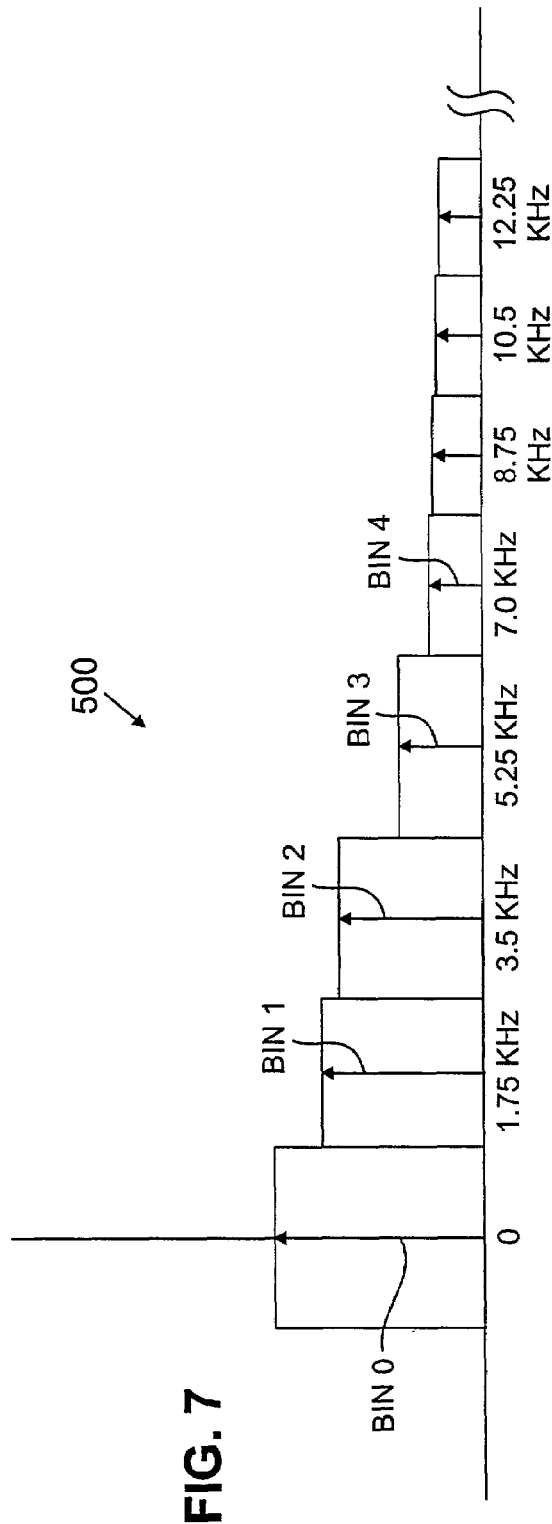
FIG. 7 shows a partial frequency response of an exemplary noise signal estimate generated by the noise measurement circuit of FIG. 1.

As is well known in the art, the frequency bins comprise scalar quantities representative of the amount of certain frequency components present in the analyzed signal. For example, FIG. 7 shows a partial frequency response of an exemplary noise signal estimate generated by an DFT. The partial frequency response of FIG. 7 includes a plurality of frequency bins including bin 0, bin 1, bin 2, bin 3 and bin 4. Each frequency bin provides an approximate level of the signal energy of the noise signal estimate that is located within a particular frequency band.

The resolution of the DFT, as is known in the art, defines the width of the frequency band represented by each bin, as well as the spacing between adjacent bins. The resolution of the DFT depends upon the duration of the analyzed signal segment. In the present embodiment, the duration of the analyzed signal segment is substantially equal to the duration of the vertical synchronization interval of a standard NTSC signal. The vertical synchronization interval has a duration that is equivalent to nine horizontal lines of a standard television signal. Because horizontal lines occur at a frequency of 15.734 kHz, the duration of the vertical synchronization interval is (1/15734)*(9) or 572 microseconds. Accordingly, in the present embodiment, the resolution of the DFT is equal to 1/(duration), which would be 1/(572 u-sec) or approximately 1.75 kHz.

As a result, each bin corresponds to a frequency band of 1.75 kHz, and are spaced 1.75 kHz apart, starting at DC. For example, as illustrated in FIG. 7, the first frequency bin, bin 0, is centered at DC and corresponds to a band extending from −875 Hz to 875 Hz, or effectively, DC to 875 Hz. Bin 0 thus provides an estimate of the energy of the exemplary noise signal estimate that is located between DC and 875 Hz. The second frequency bin, bin 1, is centered at 1.75 kHz and extends from 875 Hz to 2.725 kHz. Analogous to bin 0, bin 1 provides an estimate of the energy of the exemplary noise signal estimate that is between 875 Hz and 2.725 kHz.

The frequency range of the frequency response defines the upper frequency limit, in other words, the highest frequency for which a frequency bin is generated. As is known in the art, the frequency range of the DFT frequency response corresponds to the sampling rate of the analyzed signal. In particular, the frequency range begins at DC and extends to one-half of the sampling rate. Thus, according to the present embodiment in which the sampling rate is 10 MHz, the frequency range of the DFT generated by the noise processor is from DC to 5 MHz.

It will be noted that in order to further refine the noise measurements generated by the present invention, it would be advantageous to increase the duration of the select portion of the television signal. The increased duration would result in a finer resolution, which in turn increases the precision of the noise measurement. To increase the duration of the select portion of the television signal, the select portion could be defined to include both the vertical synchronization interval and one or more adjacent quiet lines.

Specifically, in NTSC standard television signals, the vertical synchronization signal is typically followed by several quiet lines in which video information is not transmitted. Such quiet lines are theoretically predictable and repeatable, similar in that respect to the vertical synchronization interval itself. If the select portion of the television signal is defined as the vertical synchronization interval plus one succeeding quiet line, the duration of the analyzed signal would increase from nine horizontal lines to ten horizontal lines, and the resolution would become (15734/10) or 1.5734 kHz.

Such a select portion definition, however, may not provide reliable results. In particular, the quiet lines of NTSC television signals are often employed to transmit text data or other information, and therefore are not guaranteed to be predictable or repeatable. If the quiet line in the defined select portion includes unpredictable and changing information, it cannot be used for accurate noise measurements.

It will further be noted that it may be preferable in some circumstances to utilize fast Fourier transform techniques to generate the DFT frequency response. A fast Fourier transform is a variation of a DFT that has reduced computational time. Those of ordinary skill in the art may readily implement fast Fourier transform if deemed necessary in their particular implementation.

In any event, referring again to FIG. 1, once the noise processor 22 generates the frequency response, the noise calculator 23 may then isolate the noise signal estimate energy caused by a particular type of noise. In particular, the noise calculator 23 obtains an adjusted frequency response that consists of frequency bins corresponding to the frequencies in which the particular type of noise is located. The noise calculator 23 effectively ignores the other frequency bins.

For example, if CTB noise is to be measured, the noise calculator 23 obtains an adjusted frequency response that comprises only those frequencies at or below 100 KHz. Moreover, the noise calculator 23 takes further steps to remove the energy in the frequency response of the noise signal estimate that is due to hum noise. In particular, the noise calculator 23 removes the frequency bin corresponding to DC, such as bin 0 of FIG. 7, to remove any hum noise component from the CTB noise measurement. Specifically, hum noise energy is concentrated around low frequency multiples of 60 Hz. Accordingly, substantially all of the noise energy attributable to hum noise is located in bin 0. The noise calculator 23 therefore removes bin 0 from the frequency response and replaces it with an estimate of the CTB noise energy at the frequency associated with bin 0, or in other words, at DC. It has been determined that the CTB noise energy located in bin 1, i.e. between 875 Hz and 2.625 kHz, is substantially similar to the CTB noise energy located in bin 0. Accordingly, the noise calculator 23 of the present invention uses the frequency bin 1 as the estimate of frequency bin 0.

In another example, if CSO noise is to be measured, then the noise calculator 23 uses only those frequency bins from the frequency response that fall within 100 kHz of each of 0.75 MHz and 1.25 MHz.

In addition, if snow noise is to be measured, then the noise calculator 23 ignores all the frequency bins from the frequency response that could possibly contain CSO, hum or CTB noise. Accordingly, the noise calculator 23 ignores all frequency bins except those that correspond to frequencies between 100 kHz and 700 kHz. It should be noted that because snow noise energy is relatively evenly distributed across the frequency spectrum, sufficient information regarding snow noise may be determine from a 100 kHz frequency band located between 100 kHz and 700 kHz. As a result, the noise calculator 23 may suitably determine the snow noise level using frequency bins that correspond to a 100 kHz (or even narrower) frequency band located between 100 kHz and 700 kHz.

The noise calculator 23 then generates a noise power measurement for the particular type of noise by integrating the adjusted frequency response.

In particular, to generate a measurement of CTB noise from a properly adjusted frequency response, the noise calculator 23 takes integrals of the noise power through a 30 kHz window moving from DC to 100 kHz. The integral of the 30 kHz frequency band having the maximum noise is used as the CTB noise power measurement.

In an example in which a measurement of CSO noise is to be generated, the noise calculator 23 takes integrals of the noise power through a 30 kHz window moving from 0.7 MHz to 0.8 MHz and also moving from 1.2 MHz to 1.3 MHz. The integral of the 30 kHz band having the maximum noise is used the CSO noise power measurement.

The noise calculator 23 also determines the carrier power level using the information signal estimate received from the information signal extractor 20. To this end, the noise calculator may perform a root mean squares power calcuation or the like on the peaks of the received information signal estimate. The noise calculator 23 then provides to the display 25 the ratio of the noise power measurement to carrier power level.

Accordingly, the present invention provides a method of measuring noise in which different types of noise may be isolated and measured using digital signal processing techniques. By using DFT techniques to generate a frequency response of the noise signal estimate energy, the noise signal energy due to any of the particular types of noise may be generated. Moreover, the frequency response may further manipulated as described above to remove virtually all hum noise components from the CTB measurement, thereby increase measurement accuracy.

The use of the frequency response further facilitates the removal of snow noise power, which is present at all frequencies, from the measurement of CSO and CTB noise. If removal of the the snow noise power from a measurement of either CSO or CTB noise is desired, the snow noise power may be measured and then subtracted from the CSO or CTB noise power measurement generated in the manner described above.

For example, consider a first measurement generated in the manner described above in connection with the generation of a CTB noise measurement. Because snow noise is typically present at all frequencies, the first measurement represents the CTB noise measurement combined with a measurement of the snow noise that is found in the frequency range of the first measurement. To remove the portion of the first measurement that is attributable to snow noise, the noise processor 22 provides an adjusted frequency spectrum to the noise calculator 23 that contains a 100 kHz frequency band located between 100 kHz and 700 kHz, where snow noise alone is located. The noise calculator 23 then generates a snow noise measurement using the same integration techniques.

In particular, the noise calculator 23 obtains integrals of the noise power through a 30 kHz window moving through the 100 kHz snow noise frequency band. The average integral of the 30 kHz bands is then used as the average snow noise measurement. The average snow noise measurement, which represents the snow noise over 30 kHz, may then be subtracted from the first measurement to remove the influence of the snow noise therefrom. The resulting measurement represents an enhanced CTB noise measurement with little or no snow noise contributing to the measurement.

It will be noted, however, that snow noise is often negligible and therefore typically does not have to separated from the initial CTB or CSO noise power measurements using the methods described above.

If snow noise itself is to be measured, then the noise calculator 23 extrapolates the average snow noise measurement over the entire spectrum being measured. In the present embodiment, the snow noise may be determined for a CATV channel, which may be considered to have a 4.2 MHz bandwidth. To obtain the snow noise for the entire band, the average snow noise measurement is multiplied by (bandwidth/30 kHz), or 140.

Regardless of the type of noise being measured, the present invention thus provides several advantages over prior in-service noise testing devices. In particular, by generating a frequency response of the noise signal estimate, the present invention provides a means by which certains types of noise may be measured in an otherwise combined noise signal. Moreover, the use of digital processing methods to generate the frequency response eliminates the need for analog filters to isolate various types of noise for measurement. The reduction of analog filters reduces component costs for the device. Similarly, the use of digital carrier recovery techniques, instead of analog demodulation, eliminates the need for, and cost associated with, analog demodulation circuitry.

The above embodiment of the present invention further provides enhanced accuracy of measurement by using the vertical synchronization interval as the basis for the digital signal segment. In addition to being a predictable and repeating pattern, which facilitates isolation of the noise signal in an in-service channel, the vertical synchronization interval is the longest contiguous predictable and repeating pattern in the standard NTSC television signal frame. Such relative length of the vertical synchronization interval allows for the DFT-generated frequency response to have a sufficiently fine resolution for accurate measurement.

In particular, the fine resolution offered by the present embodiment, 1.75 kHz resolution, allows for the first bin (bin 0) to be removed from the frequency response and be replaced by an estimate thereof to reduce the effects of hum noise in the CTB measurement, as discussed above. The removal of bin 0 is possible because the remaining bins provide enough information about the CTB noise spectrum to allow estimation of the CTB noise that should be present in the frequencies represented by bin 0. If, by contrast, a digital signal segment corresponding to a single horizontal line is used, then only 15.734 kHz resolution is provided. In such a case, if bin 0 is removed to eliminate the effects of hum, the remaining bins do not provide sufficient information to estimate the CTB noise. In particular, bin 0 in a frequency response having 15.734 kHz resolution will represent the noise signal in frequencies from DC to approximately 7.67 kHz. In some cases, almost all of the CTB noise is located in that frequency range, and thus the removal of bin 0 would prevent any measurement of CTB noise. As a result, the use of a digital signal segment consisting of a single horizontal line of a television signal will not produce a sufficient frequency spectrum to allow the removal of hum noise from the CTB noise measurement.

FIGS. 2, 3, 4A, 4B, 5A and 5B, discussed below, illustrate in further detail of the functions performed by the DSP 16, as well as the flow of information, in other words, digital signals, between the functions performed by the DSP 16. For purposes of clarity, operations of the DSP 16 are represented by functional blocks. While the functional blocks are given device names, their function is typically carried out by programming the DSP 16 to perform the described function. It will be appreciated, however, that those of ordinary skill in the art may readily utilize discrete digital components to carry out a part or all of the functions associated with one or more of the functional blocks illustrated in FIGS. 2, 3, 4A, 4B, 5A and 5B.

FIG. 2 shows a first embodiment of the demodulator 18 of FIG. 1 The demodulator of FIG. 2 is a carrier recovery deodulator 18 that comprises an input 102, a carrier recovery block 104, a multiplier 106, a low pass filter 108 and an output 110. As discussed above, the demodulator 18 recieves the digital video signal, or digital signal segment, and produces a baseband signal therefrom. As illustrated in FIG. 2, the demodulator 18 receives the digital signal segment at the input 102 and provides the baseband component, or baseband signal at its output 110.

The digital signal segment received at the input is fairly approximated by the quantity:

$$DSS = CARRIER * VIDEO + NOISE,$$

where CARRIER is the down-converted carrier signal (at the intermediate frequency), VIDEO is the information signal, and NOISE is the noise signal, which may include CTB and CSO components. It is noted that the signal CARRIER may further include, among other things, a hum noise component. The signal provided at the output 110 will be a baseband signal that includes ½(VIDEO+NOISE'), where NOISE' is a frequency converted version of the signal NOISE, and may further includes the hum noise from the signal CARRIER.

In mathematical terms, the DSS may be approximated by the following relationship.

$$DSS = TV(t)\cos(wt) + a\cos((w+w')t)$$

where TV(t) is VIDEO, cos(wt) is CARRIER, and a cos(w't) is NOISE (including a scalar component a and a frequency component cos(w't)). It is noted that the above approximation is simplified for the purposes of assisting in explaining the theory of operation of the present invention, and does not include all components of a true digital video signal segment. For example, the signal NOISE is represented as having a single frequency component, w+w', and the phase components to CARRIER and NOISE are omitted. Such simplifications facilitate the theoretical explanation.

The carrier recovery block 104 is a functional block that generates a reliable estimate CARRIER_EST of the carrier signal CARRIER. CARRIER_EST in the above terms may be written as cos(w"t), where w" is a frequency value close to if not substantially identical to the value w. The steps required to carry out the function of the carrier recovery block 104 are discussed further below in connection with FIGS. 4A and 4B. In summary, however, the carrier recovery block 104 provides the estimate CARRIER_EST to a multiplier 106, while the signal DSS is contemporaneously provided to the multiplier 106. The multiplier 106 then multiplies DSS and CARRIER_EST to generate a product PROD:

$$\begin{aligned}
PROD &= CARRIER\_EST * [(CARRIER * VIDEO) + NOISE] \\
&= \cos(w"t) * \{TV(t)\cos(wt) + a\cos((w + w')t)\} \\
&= TV(t)\cos(wt)\cos(w"t) + a\cos((w + w')t)\cos(w"t) \\
&= (\tfrac{1}{2})TV(t)\{\cos[(w - w")t] + \cos[(w + w')t]\} \\
&\quad + (a/2)\{\cos[(w - w" + w')t] + \cos[(w + w" + w')t]\} \\
&= (\tfrac{1}{2})\{TV(t)\cos[(w - w")t] + a\cos[(w - w" + w')t]\} \\
&\quad + (\tfrac{1}{2})\{TV(t)\cos[(w + w")t] + a\cos[(w + w" + w')t]\}
\end{aligned}$$

Because the carrier recovery block 104 generates a fairly accurate estimate of the signal CARRIER, or in other words, w"=w, then, the value w may be substituted for w" and the following equation results:

$$PROD = (\tfrac{1}{2})\{TV(t) + a\cos(w't)\} + (\tfrac{1}{2})\{TV(t)\cos(2wt) + a\cos[(2wt+w')t]\}$$

Thus, PROD=(½)(VIDEO+NOISE')+(½)(CARRIER"* VIDEO+NOISE"), where CARRIER" is a signal having approximately twice the frequency of the signal CARRIER, NOISE' is a down-converted version of the signal NOISE, and NOISE" is a version of the noise signal having twice the frequency of the signal CARRIER.

The signal PROD is then provided to the low pass filter 108, which has a cut-off frequency below the carrier frequency, thereby providing the signal BASEBAND, where BASEBAND=½(VIDEO+NOISE'). The signal BASEBAND is then provided to the output 110, which may subsequently be provided to the information signal extractor 20 (see FIG. 1).

Figure 4A:
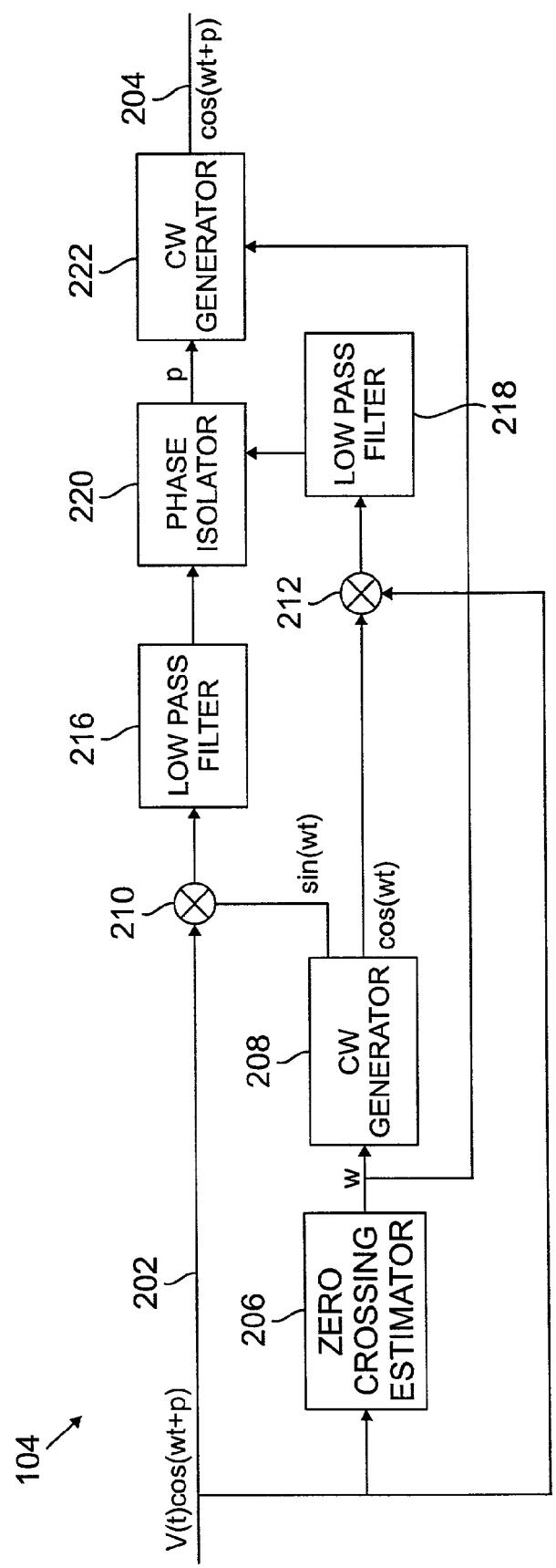
FIG. 4A shows a first embodiment of a carrier recovery block for use in the carrier recovery demodulator of FIG. 2.
Figure 4B:
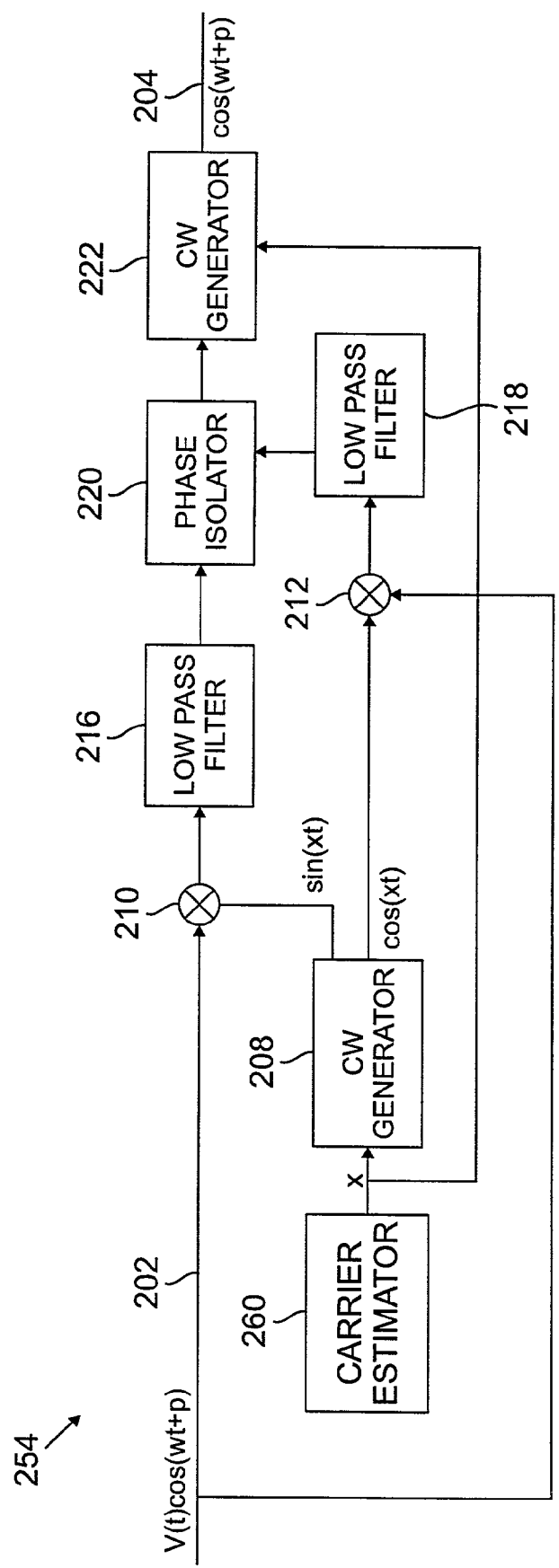
FIG. 4B shows a second embodiment of a carrier recovery block for use in the carrier recovery demodulator of FIG. 2.

FIGS. 4A and 4B show alternative embodiments of the carrier recovery block 104 that is used in the carrier recovery demodulator of FIG. 2. FIG. 4A shows a first embodiment of a carrier recovery block 104 that uses a zero crossing estimator to obtain the frequency of the signal CARRIER. FIG. 4B shows a second embodiment of a carrier recovery block 104 that uses a rough estimate of the signal CARRIER and then refines the rough estimate.

Referring to FIG. 4A, the carrier recovery block 104 includes an input 202, an output 204, a zero crossing estimator 206, a continuous wave ("CW") generator 208, first and second multipliers 210 and 212, respectively, first and second low pass filters 216 and 218, respectively, a phase isolator 220, and a second CW generator 222.

The input 202 is connected to each of the first multiplier 210, the zero crossing estimator 206, and the second multiplier 212. The first and second multipliers 210 and 212, respectively, each are operable to multiply two digital input signals together to generate an output signal. The zero crossing estimator 206 is operable to receive a digital signal and generate an estimate of the frequency of the received digital signal by detecting and analyzing the zero crossings therein. Those of ordinary skill in the art may readily employ digital signal processing algorithms to carry out the functions described above in connection with the zero crossing estimator 206 and the multipliers 210 and 212.

The zero crossing estimator 206 further connected to both the first and second CW generators 208 and 222, respectively. The first and second CW generators 208 and 222 are operable to receive as inputs both frequency and phase information and produce therefrom a sine and/or cosine wave signal having a frequency and phase corresponding to the frequency and phase information received at their inputs.

An exemplary CW generator may be implemented in a DSP-based configuration in the following manner. Generally, the CW generator uses a look-up table, stored within a memory, that contains a digital representation of a sine wave. For example, the look-up table may include 360 entries, each entry representing the instantaneous magnitude value of a sine wave for a particular degree in a cycle. The CW generator then receives as inputs, frequency and phase information, as well as a clock signal. The CW generator then uses the frequency information to determine how fast to progress through the table. More specifically, the frequency information multiplied by the clock information, added to the phase information, identifies exactly which value of the look-up table should be produced at the output of the CW generator. Those of ordinary skill in the art may readily program a digital signal processing device or otherwise configure discrete elements to perform the functions described above in connection with the CW generators 208 and 222.

The first CW generator 208 is further connected to the first multiplier 210 and the second multiplier 212. The output of the first multiplier 210 is provided to the first low pass filter 216 and the output of the second multiplier 212 is provided to the second low pass filter 218. The first and second low pass filters 216 and 218, respectively, are each further connected to the phase isolator 220. The first and second low pass filters 216 and 218, respectively, may suitably be ordinary digital low pass filters, such as finite or infinite impulse response filters. The first and second low pass filters 216 and 218 each have a cut off frequency below twice the frequency of the signal CARRIER. The first and second low pass filters 216 and 218 should each have at least 70 dB of attenuation in the stop band.

The phase isolator 220 is a device that receives a time-varying phase signal, such as sin [p(t)], and a 90° phase-shifter version of that signal cos [p(t)] and produces the time-varying phase angle or value, p(t), as an output. The phase isolator 220 may readily be implemented using digital signal processing techniques. In the present embodiment, the phase isolator 220 receives both a sin [p(t)] value and a cos [p(t)] value corresponding to each digital sample corresponding to or indexed by t. For each digital sample, the sign of each of those signals is first examined to determine the quadrant in which time-varying phase component may be found. Then, the first signal is divided by the second signal, which produces a tangent value of the time-varying phase component. Then, the inverse tangent of the tangent value is taken, which, combined with the quadrant information, determines the precise instantaneous phase angle for that sample. In summary, the phase isolator 220 receives a signal sin [p(t)] at one input and cos [p(t)] at the other input and generates a value representative of the value of p for each sample indexed by t.

For example, consider an example wherein the instantaneous value of p(t)=150°. The phase isolator 220 receives at its two inputs sin(150°) and cos(150°), or 0.5 and −0.87, respectively. The phase isolator 220 first determines that because the sine value is positive and the cosine value is negative, the angle p(t) is in the second quadrant. The phase isolator 220 then divides 0.5 by −0.87 and takes the arctangent of the result, yielding p(t)=150°.

The operation of the carrier recovery block 104 illustrated in FIG. 4A is described herebelow. As an initial matter, it is noted that the input signal is CARRIER*VIDEO+NOISE, as discussed above in connection with FIG. 2. For the purposes of discussing the removal of the carrier in connection with FIG. 4A, (CARRIER*VIDEO)+NOISE may be written as V(t)cos(wt+p), where V(t) is equal to the information signal, VIDEO, and cos(wt+p) is the signal CARRIER. The NOISE signal is sufficiently small compared to the signal VIDEO such that it may be ignored during the discussion of the carrier recovery block 104. It is noted that the input signal is represented in a different form for this discussion of FIG. 4A than it was for the discussion of the theory behind the circuit in FIG. 2. Both equations are essentially accurate, except that FIG. 2 required that the VIDEO and NOISE signals be represented separately, and the phase of the signal CARRIER was not important. By contrast, the distinction between the VIDEO and NOISE signals is not relevant to the discussion of FIG. 4A, but the phase of the signal CARRIER is important.

In operation, the input 202 provides V(t)cos(wt+p) to each of the first multiplier 210, the second multiplier 212, and the zero crossing estimator 206. The zero crossing estimator 206 determines the frequency of the signal, w, using analysis of the zero crossings of V(t)cos(wt+p). The zero crossing estimator 206 generates a digital value representative of w and provides w to both the first and second CW generators 208 and 222, respectively. The first CW generator 208 generates both a sine wave and a cosine wave using the frequency value w received from the zero crossing estimator 206. No phase information is provided to the first CW generator 208, and thus the fist CW generator 208 provide output signals with no phase component. Specifically, the outputs are sin(wt), which is provided to the first multiplier 210, and cos(wt), which is provided to the second multiplier 212.

The first multiplier 210 thus receives V(t)cos(wt+p) and sin(wt) and multiplies those two signals together. The result of the multiplication is ½V(t){ sin(2wt+p)−sin p}. The low pass filter 216 removes all but the component −½V(t)sin p, which is then provided to the phase isolator 220. Similarly, the second multiplier receives V(t)cos(wt+p) and cos(wt) and multiplies those signals together. The result of the multiplication is ½V(t){ cos(2wt+p)+cos p}. The second low pass filter 218 removes all by the component ½V(t)cos p, which is then also provided to the phase isolator 220. The phase isolator 220 operates as discussed above to generate the phase angle, p, from the received signals ½V(t)cos p and −½V(t)sin p. The phase isolator 220 provides the phase angle p to the second CW generator 222. The second CW generator 222 uses the received phase angle p and the value w received from the zero crossing estimator 206 to generate a signal cos(wt+p). The signal cos(wt+p) represents the signal CARRIER_EST. Although the output of the second CW generator 222 is shown to be substantially equivalent to the signal CARRIER, such output will actually only be the estimate, CARRIER_EST. The estimate signal, CARRIER_EST, may then be utilized as described above in connection with FIG. 2.

FIG. 4B shows an alternative embodiment of a carrier recovery block 254, which may suitably be substituted for the carrier recovery block 104 in FIG. 2. The alternative carrier recovery block 254 has a substantially similar configuration as the carrier recovery block 104 of FIG. 4A with a few exceptions. For ease of reference, identical components in FIGS. 4A and 4B are denoted with identical reference numerals. The only differences between the carrier recovery block 104 and the alternative carrier recovery block 254 are that the zero crossing estimator 206 of FIG. 4A is replaced with a carrier estimator 260, and the input 202 is not connected to the carrier estimator 260.

In operation of the alternative carrier recovery block 254, the input 202 receives the signal V(t)cos(wt+p), as above, and provides the signal to the first and second multipliers, 210 and 212, respectively. The carrier estimator 260 provides an estimate, x, of the carrier frequency, w, to the first CW generator 208 and the second CW generator 222. To this end, because the carrier frequency does not change, and thus the estimate, x, does not change, the carrier estimator 260 may simply be a permanent stored value equal to the carrier frequency estimate. In any event, the first CW generator 208 provides two outputs using the frequency estimate, x. Specifically, the first CW generator 208 provides a sine wave signal, sin(xt) to the first multiplier 210, and a cosine wave signal cos(xt) to the second multiplier 212.

The first multiplier 210 multiplies the signals V(t)cos(wt+p) and sin(xt), thereby producing the signal ½V(t){ sin [(w+x)t+p]−sin [(w−x)t+p]}. The first low pass filter 216 substantially removes all components except for the signal −½V(t)sin [(w−x)t+p], which is then provided to the phase isolator 220. Similarly, the second multiplier 212 multiplies the signal V(t)cos(wt+p) with cos(xt), thereby producing the signal ½V(t){ cos [(w+x)t+p]+cos [(w−x)t+p]}. The second low pass filter 218 substantially removes all components except for the signal ½V(t)cos [(w−x)t+p], which is then also provided to the phase isolator 220. The phase isolator 220 receives the signals −½V(t)sin [(w−x)t+p] and ½V(t) cos [(w−x)t+p], and produces the value (w−x)t+p, which is then provided to the second CW generator 222.

The second CW generator 222 receives the phase value (w−x)t+p and the estimated frequency x from the carrier estimator 260 and produces the signal cos(wt+p) therefrom. The signal cos(wt+p) is the signal CARRIER, or more accurately, an estimate, CARRIER_EST, of the signal CARRIER. The signal CARRIER_EST may then be used as described above in connection with FIG. 2.

The carrier recovery blocks 104 and 254 illustrated in FIGS. 4A and 4B, respectively, each provide a highly accurate estimate of the carrier signal which allows the received signal to be sampled at a relatively low sampling rate such as that specified for the A/D converter 14 of FIG. 1. The sampling rate, as discussed above in connection with FIG. 1, may suitably be on the order of five times the IF carrier frequency. Such a low sampling rate is not compatible with other digital demodulation techniques, such as digital envelope detection. In envelope detection, the peaks of the digitally sampled signal are analyzed and passed through a low pass filter in order to demodulate the signal. If only five samples are provided for every cycle of the signal, then in cannot be guaranteed that the peak value of the signal will be digitized. As a result, such a low sampling rate can introduce distortion in an envelope detection demodulation process. Such distortion may add substantially to the measured noise component of the signal and in fact effectively destroy the integrity of the measurement.

Nevertheless, it will be appreciated that the use of a higher sampling rate to IF carrier frequency ratio would facilitate the use of an envelope detector circuit instead of the carrier recovery demodulator illustrated in FIG. 2. However, increasing that ratio requires increasing the sampling rate, which can add to the cost of implementation.

In any event, the use of any digital demodulation technique reduces the cost normally associated with analog demodulation circuitry. In particular, analog demodulation circuitry may be any number of devices, including a log amp detector. The digital demodulation techniques described above utilize digital signal processing circuitry, such as a digital signal processor, that is already included in the circuit for other reasons. Thus, the use of digital demodulation can eliminate the requirement for special analog demodulation circuitry without requiring additional digital circuit components.

FIG. 5A shows an information signal extractor 20 for use in connection with a first embodiment of the present invention. In particular, the information signal extractor 20 of FIG. 5A is used in the noise measurement circuit 10 of FIG. 1. The information signal extractor 20 of FIG. 5A is compatible for use with, among other things, the embodiment of the demodulator 18 described above in connection with FIG. 2. The information signal extractor 20 includes an input 301, a synchronizer 302, an information signal estimator 304, an adder 306, and an output 308.

In general, the information signal extractor 20 receives the baseband signal BASEBAND. The baseband signal includes an information signal, VIDEO, and a noise signal, NOISE'. Specifically, as discussed above in connection with FIG. 2, BASEBAND=½(VIDEO+NOISE') in the present embodiment, where NOISE' is a frequency converted version of the original signal NOISE. The signal NOISE' is down-converted by a frequency equivalent to the IF carrier frequency, which in the present embodiment is 2 MHz. The information signal VIDEO comprises primarily the vertical synchronization interval of a standard television signal. In any event, the information signal extractor 20 produces at its output 308 a signal consisting of an estimate of the noise signal, NOISE'.

To this end, the signal BASEBAND is first provided by the input 301. The input 301 provides the signal BASEBAND to each of the information signal estimator 304 and the adder 305 through a synchronizer 302. The synchronizer 302 operates to align the information signal within the digital signal segment such that the start of the vertical synchronization interval coincides with a particular sample in the digital signal segment.

In particular, to carry out the functions described below, the information signal extractor 20 requires that the start of the vertical synchronization interval occur at a specified sample, for example, the tenth sample of the digital signal segment. However, the gating signal generator 28 of FIG. 1 is in practicality not capable of insuring that the vertical synchronization interval starts precisely at the same sample in every digital signal segment. In fact, the start vertical synchronization interval in the present embodiment may vary up to 10 microseconds within the digital signal segment, or 100 samples. Accordingly, the synchronizer 302 is employed to provide sufficient delay to ensure that the vertical synchronization interval always starts on the same sample within the digital signal segment. To this end, the synchronizer 302 may suitably be a match filter that performs a correlation with an ideal vertical synchronization interval to detect the beginning of the vertical synchronization interval in the input signal BASEBAND. Those of ordinary skill in the art may readily implement such a match filter. It shall be noted that the synchronizer 302 does not affect that spectral qualities of the signal BASEBAND in any way.

In any event, the synchronizer 302 provides the time synchronized signal BASEBAND to the information signal estimator 304 and the adder 305. The information signal estimator 304 then generates an estimate of the signal VIDEO using an average of a plurality of previous digital signal sequences, for example, the last N digital signal sequences. To this end, the information signal estimator 304 stores and averages a number of input digital signal sequences, ½(VIDEO+NOISE'), over time. Each sequence comprises a plurality of samples that preferably correspond to the entire digital signal segment. As discussed above in connection with the operation of the A/D converter 14 of FIG. 1, the digital signal segment is selected such that the information signal is a predictable repetitive waveform, such as the vertical synchronization interval of an NTSC video signal. The use of a repetitive waveform facilitates the estimation of the information signal. Because the content of the signal VIDEO is a known and repeating waveform, the VIDEO term should always be the same value. It has been observed that the average of the NOISE' component over several sequences is substantially zero, or at least sufficiently small enough that it does not compromise the accuracy of measurements. Thus the average of the plurality of digital signal sequences is equal to the VIDEO term without the NOISE' term. The information signal estimator 304 then provides the average quantity, and more specifically, the inverted average quantity, −½VIDEO, to the adder 305.

The adder 305 thus receives the combined noise and video baseband signal, BASEBAND, and the inverted average quantity −½VIDEO, and adds the signals, thereby producing a resultant signal ½NOISE'. The adder 305 provides the signal ½NOISE' to the output 308. The output 308 provides the signal ½NOISE' to a noise processor, such as the noise processor 22 of FIG. 1. The signal ½NOISE' may suitable be adjusted by a scalar quantity either in the noise processor 22 or otherwise to obtain the value NOISE'.

It will be noted that instead of using the vertical synchronization interval portion of the video signal, a quiet line of the NTSC video signal may be used. In each NTSC video signal frame, there are a plurality of quiet lines that consist of a DC offset and a horizontal synchronization pulse. To use the quiet lines, the controller 24 of FIG. 1 would be configured to cause the A/D converter of FIG. 1 to digitize portions of the down-converted television signal that contain the quiet lines. In such a system, the signal BASEBAND would be substantially composes of ½NOISE' with a DC offset and the horizontal synchronization pulse. However, use of the quiet lines has some drawbacks. One drawback is that different systems use some or all of the potential quiet lines to transmit other information. Accordingly, a system that uses quiet lines cannot predict which potential quiet lines will actually be quiet lines in a particular implementation.

Moreover, in order to achieve the measurement accuracy of the system that uses the vertical synchronization interval, several quiet lines would have to be used. In particular, the measurement accuracy of the noise measurement system 10 of FIG. 1 depends in part on the number of samples in the digital signal segment. The digital signal processing techniques to distinguish the several types of noise, for example, fast Fourier transforms, provide results having an accuracy that increases as a function of the number of samples taken. Because the vertical synchronization interval is the equivalent of nine horizontal lines long, nine quiet lines would be required to achieve results of similar accuracy using quiet lines. Because the quiet lines are often used for other purposes, nine quiet lines per video frame are not reliably available. As a result, the use of the vertical synchronization interval is preferred over the use of quiet lines.

However, in one embodiment using quiet lines, several quiet lines of each NTS video frame may be sampled by the A/D converter 14, demodulated, and provided to the information signal extractor 20. In such an embodiment, the same method for isolating the signal NOISE' as described above may be used. In other words, the information signal estimator 304 would receive and average N groups of M quiet lines from N video frames to produce an estimate of the information signal. As discussed above, taking the average effectively removes the noise and generates a reliable estimate of the information signal. The signal estimate (scaled as necessary) may then be provided to the adder 305 to be subtracted from the signal BASEBAND.

In any event, the embodiment of FIGS. 1, 2 and 5A provides a method of digitally demodulating a digital signal segment that includes a carrier component modulated by an information signal plus noise, (CARRIER*VIDEO)+NOISE, wherein the demodulated digital signal segment, or baseband signal BASEBAND, includes an information component (VIDEO) and a noise component (NOISE'). That embodiment further removes the information signal component from the demodulated baseband signal, in order to generate a noise signal estimate. As discussed above, digital signal processing methods may then be used to measure components of the noise signal estimate (NOISE') that are due to CTB noise, CSO noise, and/or snow noise.

FIGS. 3 and 5B show alternative embodiment of the preset invention, and in particular, show alternative configurations for demodulator 18 and the information signal extractor for use in the noise measurement circuit 10 of FIG. 1. FIG. 3 shows a square demodulator 150 which may readily be employed as the demodulator 18 in the circuit of FIG. 1. The square law demodulator 150 may therefore be employed as an alternative to the carrier recovery demodulator 18 described above in connection with FIG. 2. The square law demodulator 150 includes an input 152, a multiplier 154, a low pass filter 156, and an output 158. The low pass filter 156 has a stop band defined as extending upwards from the IF carrier frequency, and preferably has at least 70 dB of attenuation in that defined stop band.

In general, the input 152 receives the digital signal segment DSS, which, as discussed above, is equal to (CARRIER*VIDEO)+NOISE. The signal DSS is then provided to both inputs of the multiplier 154. Because the signal DSS is provided to both inputs to the multiplier 154, the multiplier effectively squares the signal DSS. The squared DSS signal produces high frequency components and a baseband component. The low pass filter 158 receives the squared DSS signal and substantially removes all components except for the baseband component, which is (½)VIDEO*(VIDEO+2(NOISE')).

In particular, if the DSS signal is represented as discussed above in connection with FIG. 2, then

```
DSS  = TV(t)cos(wt) + acos[(w + w')t]
where TV(t) is VIDEO, cos(wt) is CARRIER, and acos[(w +w')t] is NOISE. The multiplier 154
multiplies DSS * DSS, which produces:
    DSS²  ={TV(t)cos(wt) + acos[(w + w')t]}²
          = TV²(t)cos²(wt) + 2TV(t)acos(wt)cos[(w +w')t] + a²cos²[(w + w')t]
          =(TV²(t)/2) {1 + cos(2wt)} + TV(t)a{cos(w't) + cos[(2w +w')t]}
             + (a²/2){1 + cos[2(w + w')t]}
          =(½){TV²(t) + 2TV(t)acos(w't) + a² }
             + (½){TV²(t)cos(2wt) + 2TV(t)acos[(2w + w')t] + a²cos[2(w + w')t]}
```

The above signal is then provided to the low pass filter 156, which removes the high frequency component and leaves (½){TV²(t)+2TV(t)a cos(w't)+a²}. The scalar of the noise signal, a, is generally so much smaller than TV(t) that the a² term drops out of the above equation, leaving (½({TV²(t)+2TV(t)a cos(w't)), or TV(t)/2*{TV(t)+2 a cos (w't)}, which may be written as (½)VIDEO*(VIDEO+2(NOISE')). As before NOISE' is a down-converted version of the original signal NOISE, plus any hum noise from the signal CARRIER.

The signal (½)VIDEO*(VIDEO+2(NOISE')) is then provided to the output 158. Although the signal (½)VIDEO*(VIDEO+2(NOISE')) is not equivalent in form to the signal BASEBAND discussed above in connection with FIG. 2. Nevertheless, the baseband signal in this embodiment, similar to that described above in connection with FIG. 2, contains both an information signal component (VIDEO), a noise signal component (NOISE'), and no carrier signal. This baseband signal is then provided to an information signal remover such as the one illustrated in FIG. 5B.

Referring to FIG. 5B, an information signal remover 350 includes an input 351, a synchronization filter 352, an information signal estimator 354, a divider 356, an adder 358 and an output 360. In operation, the information signal remover receives the baseband signal in the form of (½)VIDEO*(VIDEO+2(NOISE')) at the input 352 and generates the signal NOISE' at the output 360.

Specifically, the input 351 provides the input signal (½)VIDEO*(VIDEO+2(NOISE')) to each of the divider 356 and the information signal estimator 354 through the synchronization filter 352. The synchronization filter 352 operates as described above to ensure that the start of the information signal (squared), VIDEO² occurs at a particular sample within the baseband signal.

The information signal estimator 354 operates in the same general manner as the video signal estimator 304 of FIG. 5A, discussed above. Specifically, the information signal estimator 354 stores and averages several signal sequences that correspond to known repetitive signal sequences of the underlying video signal, such as the vertical synchronization interval. In contrast to the information signal estimator 304 of FIG. 5A, however, the information signal estimator 354 of FIG. 5B averages the signal (½)VIDEO*(VIDEO+2(NOISE')), which provides an average of the signal (½)VIDEO² +(VIDEO*NOISE'). As before, the random nature of the signal NOISE'causes the term VIDEO*NOISE' to drop out in an average, leaving on the signal (½)VIDEO². Thus, to provide a true estimate of the signal VIDEO, the information signal estimator 354 further performs a square root operation on the average signal (without the ½scalar) quantity, VIDEO², producing an estimate of the signal, inverts the estimate signal, and provides the resulting, −(½) VIDEO to the adder 358.

The divider 356 thus receives the input signal (½)VIDEO*(VIDEO+2(NOISE')) and divides that input signal by the signal VIDEO received from the information signal estimator 354. The divider 356 provides the resulting signal, (½)VIDEO+NOISE', to the adder 358. The adder 358 add the signal (½)VIDEO+NOISE' to the signal −(½)VIDEO received from the information signal estimator 354 to produce the resulting signal, NOISE'. The adder 358 then provides the signal NOISE' to output 360. The output 360 may then provide the signal to a noise processor such as the noise processor 22 discussed above in connection with FIG. 1.

The alternative embodiment described in connection with FIGS. 3 and 5B above provide an advantage over the first embodiment because the square law demodulator 150 of FIG. 3 does not require recovery of the carrier signal, which is a computationally complicated process. The drawback, however, is that the alternative embodiment adds some complexity to the information removal stage because square root and division operations are involved. Depending on the particular hardware used, either embodiment may be more efficient (time or cost) over the other.

It will be understood that the above-described embodiments are given by way of example only, and that those of ordinary skill in the art may readily devise their own implementation that incorporate the principles of the present invention and fall within the spirit and scope thereof. For example, those of ordinary skill in the art may readily employ analog demodulation techniques to remove the carrier signal from the baseband signal. Selected portions of the baseband signal may then be digitized and provided to the information signal extractor 20 and noise processor 22. Suitable analog demodulation techniques typically require rectification of the analog signal, and such rectification adds nonlinear distortion to the signal.

Furthermore, the information signal estimator 304 of FIG. 5A may be replaced by an information signal estimator that does not average a plurality of digital signal segments, but rather stores an estimate of a known information signal component of a digital signal segment. For example, if the digital signal segment is chosen to correspond to the vertical synchronization interval of the video signal, the information signal estimator may store an estimate of a generic vertical synchronization interval sequence and provide that stored estimate to the adder 306. It is known, however, that the vertical synchronization interval varies to some degree from signal to signal. Specifically, the pulse width of the various pulses in the vertical synchronization interval can vary from channel to channel. The alternative information signal estimator would be able to determine the variations from the signal BASEBAND and adjust the estimate accordingly before providing the estimate to the adder 306. For example. While the general knowledge of the vertical synchronization interval is known, a comparator or thresholding technique may be used to gain specific knowledge of the pulse width variation with a particular vertical synchronization interval sequence. Those of ordinary skill in the art may readily generate a suitable information signal estimate using a predetermined estimate of the vertical synchronization interval and the signal BASEBAND.

In addition, the above configuration describing the operation of the DSP 16 are given by way of example only. Those of ordinary skill in the art may readily implement alternative configurations to carry out the same functions as those described above.

We claim:

1. A method of determining noise in a CATV channel, the CATV channel comprising a predetermined frequency band, the CATV channel being in-service when a transmitted carrier signal having a frequency in the predetermined frequency band is present, the method comprising:
   a) obtaining a television signal corresponding to a predetermined CATV channel, the television channel comprising a carrier signal modulated by an information signal;
   b) sampling at least a part of the television signal to produce a digital signal segment, said digital signal segment comprising a noise signal component and an information signal component, wherein said information signal component has a substantially predetermined signal pattern;
   c) processing the digital signal segment to produce a baseband signal; and
   d) obtaining an estimate of the information signal and subtracting the estimate from the baseband signal, thereby producing a noise signal estimate.

2. The method of claim 1 wherein the noise signal includes at least CTB noise and hum noise, and further comprising step e) of processing the noise signal estimate to obtain a measurement of CTB noise by obtaining a noise measurement from said noise signal estimate and substantially reducing a portion of the noise measurement that is attributable to hum noise.

3. The method of claim 2 wherein step e) further comprises obtaining the noise measurement by first generating a frequency response of the noise signal estimate, wherein the frequency response comprises a plurality of frequency bins, each representative of an energy of the noise signal component within a predetermined frequency band.

4. The method of claim 3 wherein step e) further comprises performing a discrete Fourier transform to generate the frequency response of the noise signal estimate.

5. The method of claim 3 wherein step e) further comprises removing at least one frequency bin in which substantially all of the portion of the noise measurement that is attributable to hum noise is located in order to substantially reduce the portion of the noise measurement that is attributable to hum noise.

6. The method of claim 3 wherein step e) further comprises employing a digital filter to substantially reduce the hum noise in the noise signal estimate before obtaining the noise measurement.

7. A method of determining noise in a television signal, the television signal comprising a baseband signal modulated onto the carrier signal, the method comprising:
   a) obtaining a digital signal segment comprising a baseband component, said baseband component further comprising a noise signal component and an information signal component, the information signal component having a substantially predetermined signal pattern;
   b) obtaining an estimate of the information signal and subtracting the estimate from the baseband signal, thereby producing a noise signal estimate;
   c) obtaining a noise measurement by first generating a frequency response of the noise signal estimate, wherein the frequency response comprises a plurality of frequency bins, each representative of an energy of the noise signal component within a predetermined frequency band;
   d) employing a digital filter to substantially reduce the hum noise in the noise signal estimate; and
   e) processing the frequency response to obtain a measurement of one of CTB noise or CSO noise.

8. The method of claim 7 wherein step e) further comprises:
   processing the noise signal estimate to obtain a first measurement of CTB noise and snow noise by obtaining a noise measurement for a range of frequencies in the noise signal estimate that correspond to the frequencies in which CTB noise is located; and
   processing the first measurement by substantially reducing a portion of the noise measurement that is attributable to snow noise.

9. The method of claim 8 wherein step e) further comprises:
   determining a snow noise measurement using one or more frequency bins corresponding to a frequency band in which substantially only snow noise is present; and
   using the determined snow noise measurement to subtract the portion of the first measurement that is attributable to snow noise.

* * * * *